(12) United States Patent
Broscaru et al.

(10) Patent No.: US 9,058,203 B2
(45) Date of Patent: Jun. 16, 2015

(54) SYSTEM, APPARATUS AND METHOD FOR TRANSLATING DATA

(75) Inventors: Madalin Broscaru, Teleorman (RO); Christian Caciuloiu, Teleorman (RO)

(73) Assignee: Freescale Semiconductor, Inc., Austin, TX (US)

( * ) Notice: Subject to any disclaimer, the term of this patent is extended or adjusted under 35 U.S.C. 154(b) by 1409 days.

(21) Appl. No.: 12/515,634

(22) PCT Filed: Nov. 20, 2006

(86) PCT No.: PCT/EP2006/068690
§ 371 (c)(1),
(2), (4) Date: May 20, 2009

(87) PCT Pub. No.: WO2008/061557
PCT Pub. Date: May 29, 2008

(65) Prior Publication Data
US 2010/0058302 A1    Mar. 4, 2010

(51) Int. Cl.
*G06F 9/45* (2006.01)
(52) U.S. Cl.
CPC ....................................... *G06F 8/47* (2013.01)
(58) Field of Classification Search
USPC ......................................... 717/151, 136, 140
See application file for complete search history.

(56) References Cited

U.S. PATENT DOCUMENTS

| | | | | |
|---|---|---|---|---|
| 5,339,434 A | * | 8/1994 | Rusis | 709/246 |
| 5,524,253 A | * | 6/1996 | Pham et al. | 709/202 |
| 5,828,884 A | * | 10/1998 | Lee et al. | 717/141 |
| 5,884,314 A | * | 3/1999 | Bulusu | 1/1 |
| 5,889,992 A | * | 3/1999 | Koerber | 717/108 |
| 5,946,489 A | * | 8/1999 | Yellin et al. | 717/147 |
| 5,966,531 A | | 10/1999 | Skeen et al. | |
| 5,966,534 A | * | 10/1999 | Cooke et al. | 717/155 |
| 6,021,275 A | * | 2/2000 | Horwat | 717/159 |
| 6,085,203 A | * | 7/2000 | Ahlers et al. | 715/201 |
| 6,167,565 A | * | 12/2000 | Kanamori | 717/146 |
| 6,209,124 B1 | * | 3/2001 | Vermeire et al. | 717/114 |
| 6,295,561 B1 | * | 9/2001 | Nagy | 709/246 |
| 6,351,750 B1 | * | 2/2002 | Duga et al. | 1/1 |
| 6,438,745 B1 | * | 8/2002 | Kanamaru et al. | 717/137 |
| 6,940,870 B2 | | 9/2005 | Hamlin | |
| 6,968,548 B1 | * | 11/2005 | Tabbert | 717/162 |
| 7,681,184 B1 | * | 3/2010 | Weedon et al. | 717/137 |
| RE41,959 E | * | 11/2010 | Suzuki et al. | 712/210 |

(Continued)

OTHER PUBLICATIONS

XDR: External Data Representation Standard. RFC 1014, RFC 1832, Apr. 1988.

(Continued)

*Primary Examiner* — Lewis A Bullock, Jr.
*Assistant Examiner* — Keith C Yuen

(57) ABSTRACT

A distributed processor-based system comprises a plurality of communicating platforms, wherein a number of platforms in the distributed processor-based system comprise at least one compiler, the at least one compiler being operably coupled to data type translation logic and arranged to generate a memory layout for the respective platform. In response to an indication for a communication to occur between a first platform and a second platform the data type translation logic translates a memory layout using data type attributes for data to be transferred from the first platform to the second platform based on at least one platform-specific characteristic, such that the data does not require translating when received at the second platform.

18 Claims, 3 Drawing Sheets

(56) References Cited

U.S. PATENT DOCUMENTS

| | | |
|---|---|---|
| 2001/0056504 A1 | 12/2001 | Kuznetsov |
| 2003/0005418 A1* | 1/2003 | Sridhar et al. ............... 717/140 |
| 2003/0140333 A1* | 7/2003 | Odaka et al. ................. 717/115 |
| 2004/0015889 A1* | 1/2004 | Todd et al. ................... 717/137 |
| 2004/0123276 A1* | 6/2004 | Knueven et al. ............. 717/140 |
| 2004/0221274 A1 | 11/2004 | Bross et al. |
| 2004/0268371 A1* | 12/2004 | Carrell et al. ................ 719/330 |
| 2005/0097523 A1* | 5/2005 | Uchida ......................... 717/136 |
| 2008/0005728 A1* | 1/2008 | Morris ......................... 717/153 |

OTHER PUBLICATIONS

RPC: Remote Procedure Call Protocol Specification. RFC 1050, RFC 1831, Aug. 1995.

* cited by examiner

SYSTEM, APPARATUS AND METHOD FOR TRANSLATING DATA

FIELD OF THE INVENTION

The present invention relates to a system, apparatus and method for translating data in a data communication system. The invention is applicable to, but not limited to, application software that is arranged to translate definition of data types between software platforms.

BACKGROUND OF THE INVENTION

It is known that communication between different computer or communication systems is problematic, as interfaces are required to support communication between the respective systems, and software has to be developed to support such interaction. FIG. 1 illustrates one known simple example of a distributed communication or computer system 100 that supports multiple independent platforms. Here, different software entities 120, 125, 130 reside on respective software platforms 105, 110, 115. The software entities, by necessity, need to communicate 140 with one another, for example by exchanging data.

Thus, the software entities require functionality to exchange structured data between and amongst themselves. Structured data, in the context of the invention, encompasses data exchanged between the software entities, which are logically structured into independent elements that can be read and interpreted with the same meaning amongst each other. Each element from the exchanged data may be either a basic data type or a composite data type. The composite data type is recursively defined as either a collection of other basic or composite data types. Both basic and composite data types are known to have different platform-specific characteristics, which substantially increases the complexity in achieving efficient inter-platform communication.

U.S. Pat. No. 5,966,531, titled 'Apparatus and method for providing decoupled data communication between software processes' describes a mechanism whereby information exchange between software processes that is able to run on different platforms is decoupled from one another. U.S. Pat. No. 5,966,531 proposes to transmit data by encapsulating the data within self-describing data objects called 'forms'. These forms are self-describing, in that they include not only the data of interest, but also an indication of a type or format of the information, which describes the representations used for the data and the organization of the form.

U.S. Pat. No. 6,940,870, titled 'System and method for communicating data' describes a mechanism for communicating data between a source process and one or more destination processes, in which data is converted from a source format in each application or platform to a standard format. The data is then routed from the source process to the one or more destination processes and converted from the standard format to a destination format for each destination process. Receipt of the data is then verified at each destination process. Thus, U.S. Pat. No. 6,940,870 proposes converting all data into a standard format and sending data in such a standard form that the destination entity understands the received data and then converts it to its native form.

A further known mechanism used for data type translation is ASN.1 notation. This type of notation solves some of the inter-platform communication issues and establishes a standard convention for data type characteristics. However, a major disadvantage of using ASN.1 notation is the consequent significant and necessary increase in processing requirements, due to the fact that the data-type translation is performed bi-directionally.

In most data communication systems there is a need to optimize the speed of data transferred during run time. Thus, a need exists for an improved system, apparatus and method of transferring data.

SUMMARY OF THE INVENTION

In accordance with aspects of the present invention, there is provided a system, apparatus and method of communicating data, as defined in the appended Claims.

Figure 1:
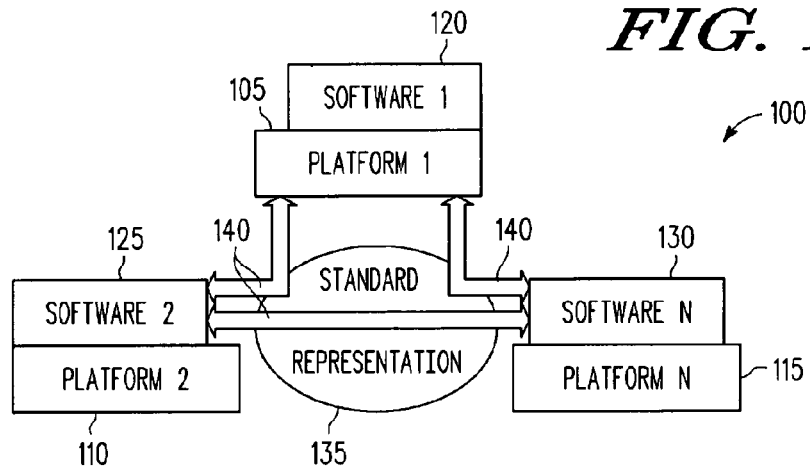
FIG. 1 illustrates a simplified representation of a known inter-platform communication system.
Figure 2:
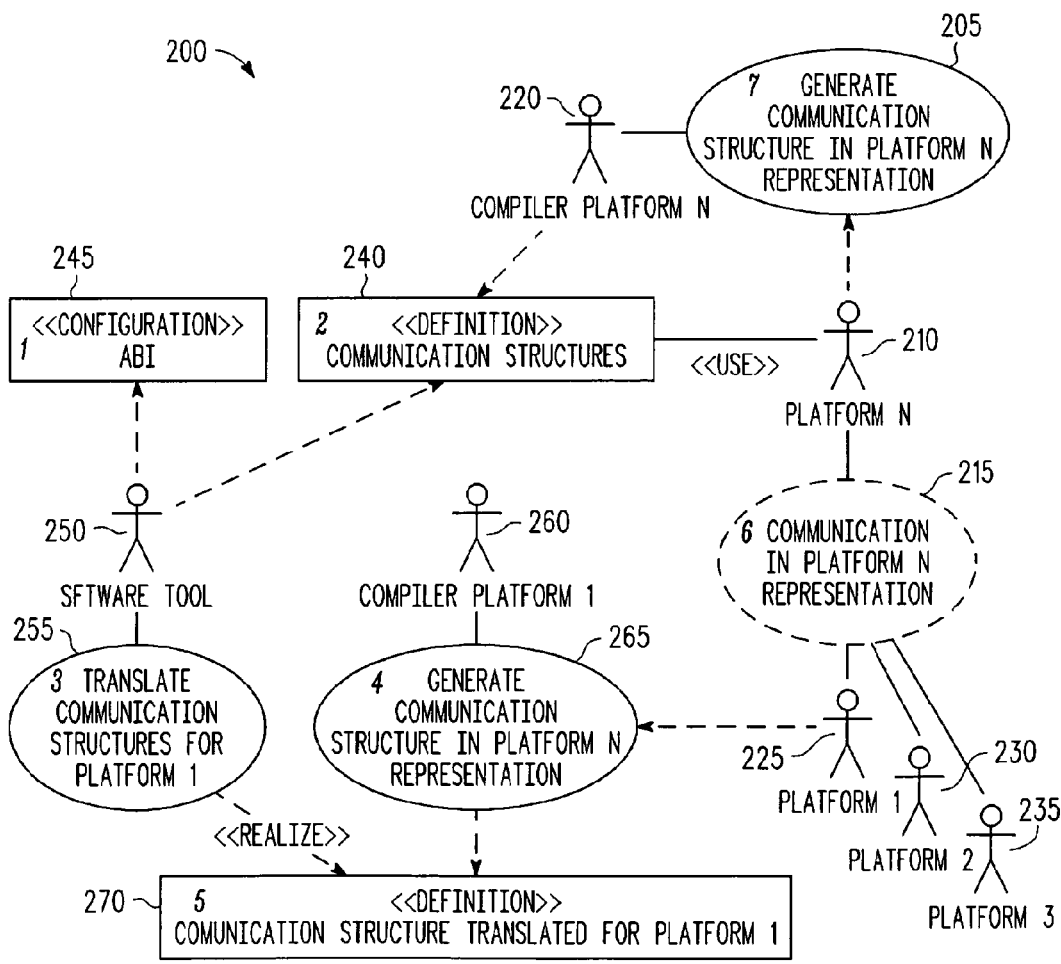
Figure 3:
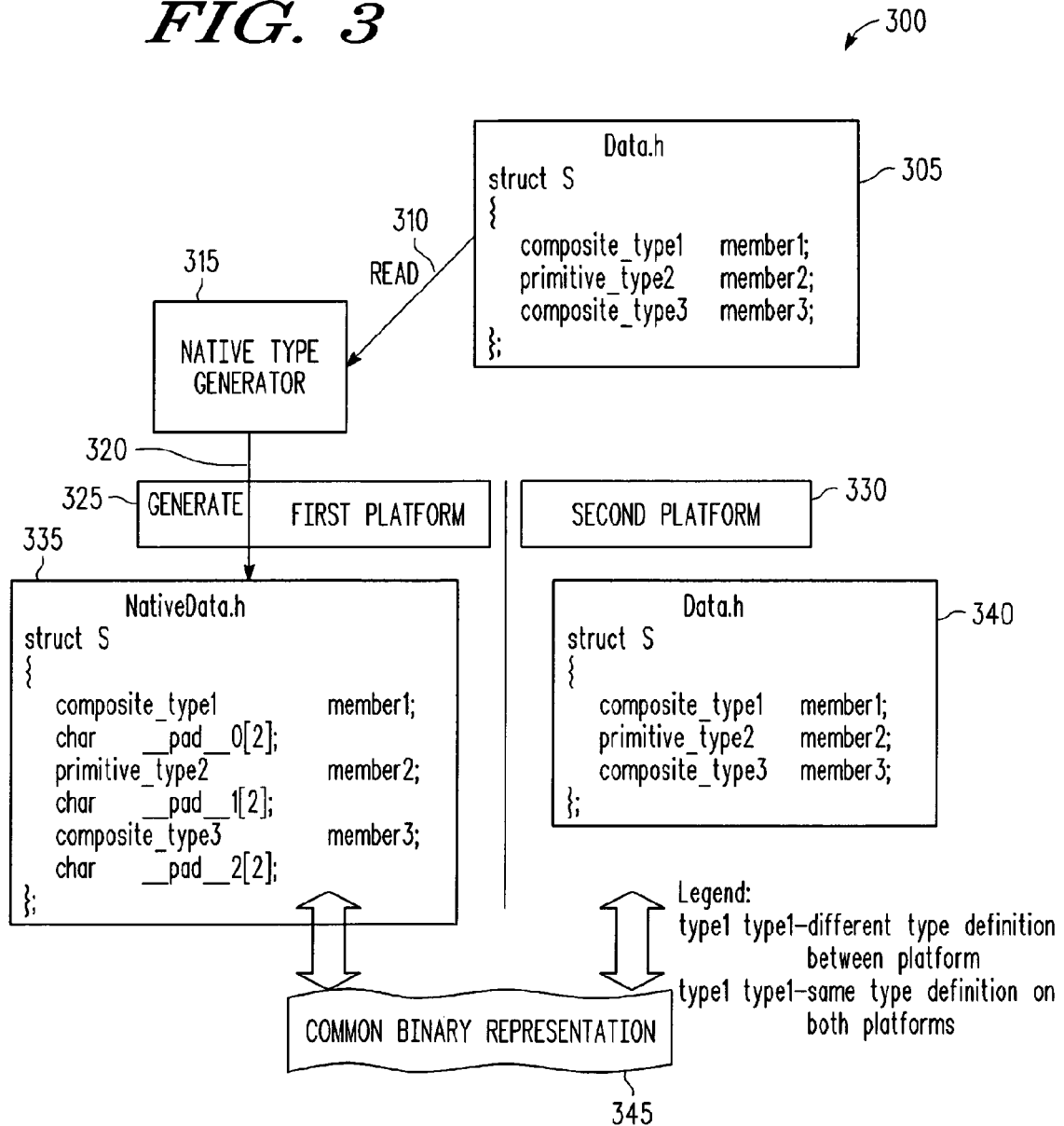
Figure 4:
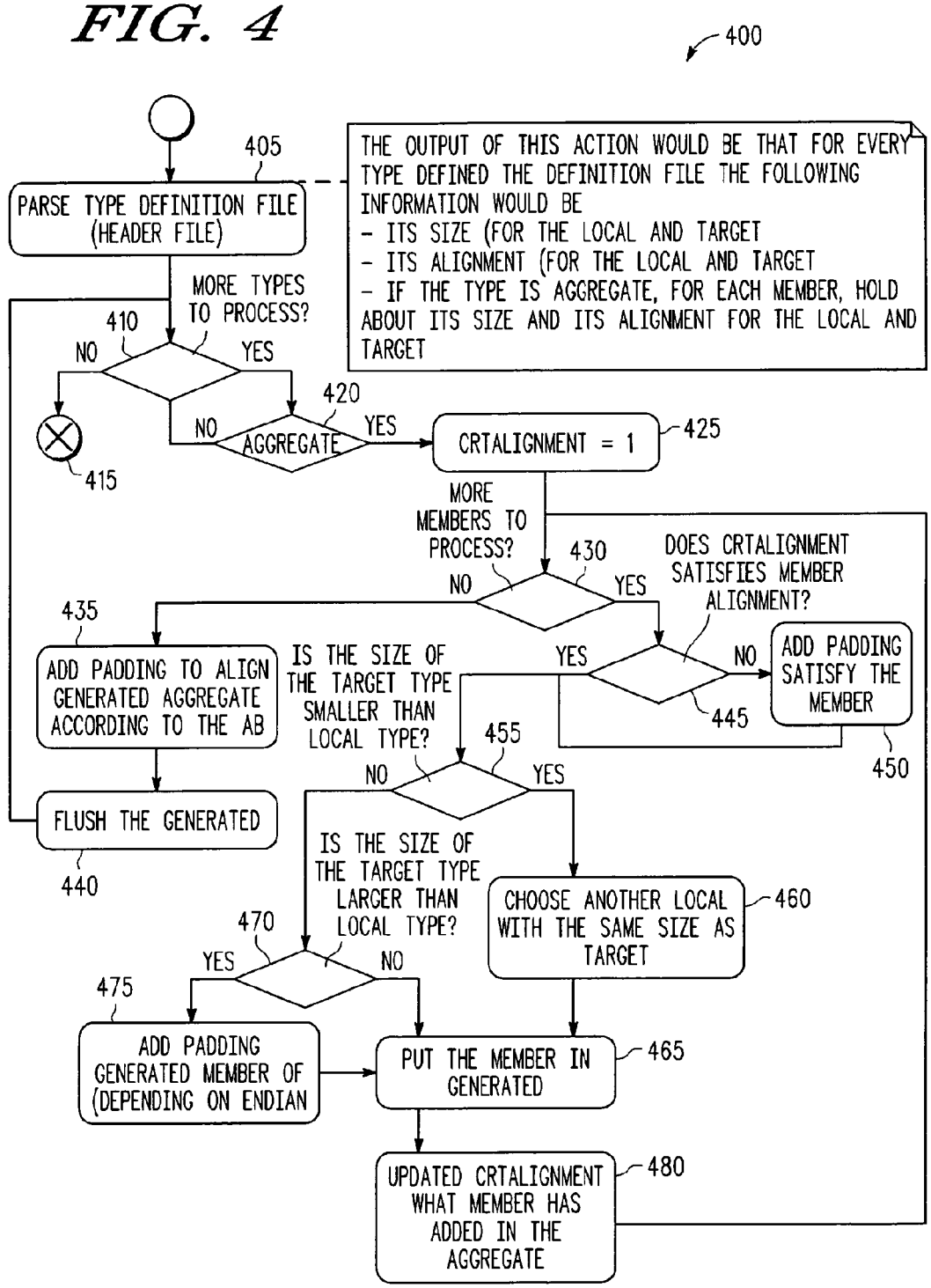

Exemplary embodiments of the present invention will now be described, by way of example only, with reference to the accompanying drawings, in which:

FIG. 2 illustrates an architecture of an inter-platform communication system, adapted in accordance with one embodiment of the present invention;

FIG. 3 illustrates a more detailed overview of an operation of the inter-platform communication system in accordance with one embodiment of the present invention; and FIG. 4 illustrates a flowchart of a process of a software tool that translates a definition of types according to one embodiment of the present invention.

DESCRIPTION OF EMBODIMENTS OF THE INVENTION

In accordance with one embodiment of the invention, a distributed processor-based system comprising a plurality of communicating platforms is described, wherein a number of platforms in the distributed processor-based system comprises at least one compiler. The at least one compiler is operably coupled to data type translation logic and arranged to generate a memory layout for the respective platform. In response to an indication for a communication to occur between a first platform and a second platform, the data type translation logic translates a memory layout using data type attributes for data to be transferred from the first platform to the second platform based on at least one platform-specific characteristic such that the data does not require translating when received at the second platform.

In one embodiment of the invention, the distributed processor-based system may be a distributed processor-based inter-platform communication or computer system. In one embodiment of the invention, the at least one platform-specific characteristic may be selected to provide a reference memory layout.

In one embodiment of the invention, the data type attributes may be described in an application binary interface that is arranged to provide interoperability between conforming software components, such as, compilers, assemblers, linkers, debuggers, and assembly language code.

In one embodiment of the invention, the translation may be performed at or before a compilation time of the data to be communicated.

In one embodiment of the invention, a first application running on the first platform may receive communicated data from a second application running on the second platform, such that data may be accessed directly in the memory layout generated by code compiled using a second compiler.

In one embodiment of the invention, software running on the first platform uses generated peer data types translated, such that the first memory layout generated at the first compiler of the first platform may be the same as the second memory layout generated on the second platform.

In one embodiment of the invention, the first compiler may comprise a software tool arranged to parse type-definitions that model the data that is to be communicated.

In one embodiment of the invention, the data type translation logic may translate a memory layout for data to be transferred from the first platform to the second platform using an endian-ness transformation.

In one embodiment of the invention, the system may be arranged to facilitate communication between different endian-ness transformations.

In one embodiment of the invention, an integrated circuit is described comprising data type translation logic arranged to translate a memory layout using data type attributes for data to be transferred from a first platform to a second platform based on at least one platform-specific characteristic such that the data does not require translating when received at the second platform.

In one embodiment of the invention, a method of transferring data in a distributed processor-based system, comprising a plurality of communicating platforms, is described. A number of platforms in the distributed processor-based system comprise at least one compiler, operably coupled to data type translation logic and arranged to generate a memory layout for the respective platform. The method comprises translating a memory layout for data to be transferred from a first platform to a second platform in response to an indication for a communication to occur based on at least one platform-specific characteristic such that the data does not require translating when received at the second platform.

In one embodiment of the invention, the method further comprises parsing a type definition file for aggregate and/or composite data types; determining whether the parsed definition file type may be aggregated; determining whether a size of a target data type is smaller than a local data type; selecting another local data type with the same size as the target type in response to determining that the size of the target data type is smaller than the local data type; and placing a member of the selected local data type in the aggregate and/or composite data type that comprises it in order to generate a type definition file.

In one embodiment of the invention, the method may further comprise padding the peer generating type by adding an unused member, or adding an unused member when no more members are available to process, in order to satisfy a data type size.

In one embodiment of the invention, the method may further comprise storing, for every type defined in the definition file for one or both of a target platform and local platform, one or more of the following:
(i) A data type size;
(ii) A data type alignment; and
(iii) If the data type is aggregate or composite, for each member, information about its size and alignment.

In accordance with one embodiment of the invention, a small overhead in data size is included that enables the data to be kept in such a form that (from the perspective of the memory layout) it does not need any transformation to be exchanged between a source platform and a destination platform.

An optimized approach, particularly in a peer-to-peer communication application where one platform is constant, uses platform-specific characteristics as influencing factors of a format (e.g. they provide rules about how to build a format for a particular data type) for data translations performed by the other platforms or data entities. In the context of the present invention, with respect to the field of inter-platform communication, it is envisaged that the expression 'platform-specific characteristics' encompasses one or more of the following:
(i) Basic and composite data type length, for example in bytes;
(ii) Basic and composite data type alignment of their physical starting position in memory;
(iii) A binary representation of data types (for example, most significant bit and byte placement).

One embodiment of the present invention will be described in terms of an inter-platform computer system comprising a plurality of platforms, compiler platforms and associated software tools. However, it will be appreciated by a skilled artisan that the inventive concept herein described may be embodied in any type of distributed processor-based communication or computer system.

Referring now to FIG. 2, a distributed processor-based system 200 according to one embodiment of the present invention is illustrated. The system 200 supports the increasing trend that more and more disparate and individual platforms need to facilitate the communication of their software applications by the reinforcement of a common representation of the exchanged data. To achieve this goal the proposed solution makes use of a software tool 250 that uses the individual compiler specifications 220, 260 (which are in practice defined as an Application Binary Interface 245) in order to generate platform specific communication data structure definitions 270, where each of them will be later used as an input in the compilation process of the software applications that are run by individual platforms 210, 225, 230, 235. The communication of the software applications comprises a plurality of communication structures 240, that contain the structured information exchanged among platforms.

In general each compiler on each platform 210, 225, 230, 235, will generate different memory layouts for the plurality of communication structures 240. Hence, in known systems, the N platforms will typically not be able to communicate with one another easily as they will not be able to readily process various and numerous data types that other platforms transmit. Hence, translation of the data type is needed between the memory layout generated and used on a first platform, say platform 210, and the memory layout that is generated and used on another platform, for example platforms 225, 230, 235.

In accordance with one embodiment of the present invention, the translation of data types is performed at compilation time, prior to runtime. In this manner, one platform-specific characteristic will be used as a reference for generation of all platform specific communication data structure definitions. In the case presented, the reference platform selected may be 'platform N' 210. In one embodiment of the invention, the criteria used for choosing the reference platform may include one or more of the following:
(i) The platform which runs the most performance constrained application;
(ii) The platform which runs the application that acts as a supplier of services for the software on the other platforms.

The platform-specific characteristics selected as a reference are presented to the Application Binary Interface (ABI) 245. An ABI 245, in the context of the invention, encompasses a definition of a set of standards intended to ensure interoperability between conforming software components, such as: compilers, assemblers, linkers, debuggers, and assembly language code.

In the context of the invention, the compiler uses the rules described in the ABI 245 for accessing the memory space whose layout was defined as being of a particular data type. The layout may be understood as a placement map of the internal elements of the composite data structure in the physical memory associated with it, which allows for an individual element to be precisely identified by its 'beginning' and 'width'.

The ABI rules may be different across platforms and/or compilers. It is also envisaged that memory layout may also differ for the same defined data type.

For the translation to be performed at the compile time, the compiler receives the input data modified in such way that after compilation the memory layout generated by the compiler will be the same as the memory layout generated on the reference 'platform-N' 210. The memory layout for a specific data type may be generated according to internals algorithms implemented by the compiler that follow the rules described in ABI 245.

In accordance with one embodiment of the present invention, the data processing is performed in a software tool 250. The software tool 250 is arranged to parse the data type-definitions that model the data that are exchanged in the communication structures 240. In FIG. 2, the software tool 250 generates the native data types that are used in communication structures for 'platform-1' 270.

One example for a composite data type defined in a "C" programming language that may be used in communication between software applications on different platforms, as would be understood by a skilled artisan, is as follows:

```
typedef struct
{
    struct
    {
        unsigned char ucX;
        unsigned char ucY;
    } sCoord;
    unsigned int uiRGB;
} sPixel;
```

In the context of the data type defined above and depending on platform characteristic of 'platform-1', the memory layout generated by the compiler 260 associated with it may appear of the form:

| Offset (bytes) | Width (bytes) | Element |
|---|---|---|
| +0 | 1 | sCoord.ucX |
| +1 | 1 | sCoord.ucY |
| +2 | 4 | uiRGB |

In this example, platform-1 225 has the ability to access a 4-byte (e.g. 32 bits) element without requiring its address to be aligned to 32 bits (e.g. x86).

On the other hand, on a 'platform-N', the associated compiler would generate a different memory layout:

| Offset (bytes) | Width (bytes) | Element |
|---|---|---|
| +0 | 1 | sCoord.ucX |
| +1 | 1 | sCoord.ucY |
| +2 | 2 | <compiler padding> |
| +4 | 4 | uiRGB |

Notably, the layout may be influenced by the fact that the platform characteristic may include two aspects that require the introduction of supplemental padding:
(i) A structure width (namely sCoord in this example) must be multiple of 4 bytes.
(ii) A 32-bits data must be located at an address 32-bits aligned The approach described herein has an objective of using a memory layout that is configured to be common among a number of platforms. In the aforementioned example, the compiler of 'platform-1' has to generate the memory layout to be used as the base for communication, starting from a different definition of the data-type obtained automatically as an output of the software tool 250. This may be referred to as a 'peer data type' on 'platform-1', and is the data type which by compilation generates the same memory layout that the original data-type generates on the 'platform-N'.

When compiled, the data output is advantageously in the format that may be understood on the target platform using its own memory layout of the target platform, say platform-N 265. The software on the 'platform-1' 225 advantageously uses the generated peer data types, which ensures that the memory layout generated at the compiler platform 260 of platform-1 265 is identical to that generated on the target platform-N 210, removing the need for a run-time conversion. In this manner, both 'platform-1' 225 and 'platform-N' 210 communicate using the same memory layout. As illustrated in FIG. 2, this concept may be extended to more than two platforms, for example platform-2 235, platform-3 235, etc. In this manner, all platforms operate as platform-1 225 using the selected reference memory layout.

The inventive concept of the present invention proposes a system, an apparatus and method to streamline complex data communication using an optimized converter from one platform specific format to another platform specific format.

The apparatus comprises a software application that is used for data structure translation (for example to translate from a first structure (S1) to a second structure (S2). In one embodiment of the present invention, the information exchanged between the two platforms is modelled at the programming level as 'C' data structures. Notably, the software tool implements an application handling automated translation of the data structures from a target platform to a native platform, prior to compilation time. In particular, the software application is arranged to parse the type definitions that model the information exchanged (S), and generates the native data types (S') that will generate through compilation the memory layout of the target platform. In one embodiment of the present invention, the software on the native platform uses the generated peer types, which ensures that the memory layout resulting from the data compilation is identical to that memory layout resulting from the target platform, thereby removing a need for a run-time conversion.

The conversion between the data layout formats is performed at the compile time. Advantageously, the number of conversions with such an approach is reduced to one, instead of the known two conversion operations, as the data layout format is converted only once.

The software tool for the generation of automated native data types is used prior to product compilation. At this step, the software tool uses the description of the Application Binary Interface (ABI) between the two platforms involved in the communication to accommodate the native data types. The output is a different set of native data types which represent the same memory layout when compiled.

The software application uses the generated data types (S') to create a binary data stream that will be used to convey data to the target platform. In one embodiment of the present invention, the access to the primitive members (e.g. the same as 'basic' data types described previously) of the structured data takes into account an endian-ness transformation (between the native and the target order), i.e. the transformation from one endian format into another.

To clarify, big-endian and little-endian are terms that describe the order in which a sequence of bytes are stored in computer memory. Big-endian is an order in which the 'big end' (most significant value in the sequence) is stored first (at the lowest storage address). Little-endian is an order in which the 'little end' (least significant value in the sequence) is stored first. For example, in a big-endian computer, the two bytes required for the hexadecimal number 4F52 would be stored as 4F52 in storage (if 4F is stored at storage address 1000, for example, 52 will be at address 1001). In a little-endian system, it would be stored as 524F (52 at address 1000, 4F at 1001).

An example of an architecture that can dynamically change the endian-ness is Freescale™'S Quad-Core Media Packet Signal Processor MSC8144.

Hence, for example, the data types that are internal to the platform and not used to communicate with the outside world, are accessed with a processor configured as big-endian (for instance), while the data retrieved from an external party may be accessed with the processor configured as little-endian.

The following example, illustrated in FIG. 3, considers two platforms 325, 330 with different representation conventions: on the first platform, the size of each structure is a multiple of the largest contained type (in bytes), while on the second platform, the size of each structure is also a multiple of the largest contained type, but is at least a multiple of four bytes.

A Struct_S 305 comprises:

```
{
    composite_type1 member1; /* structure with size 2 */
    primitive_type2 member2; /* simple type with size 2 */
    composite_type3 member3; /* structure with size 2 */
};
```

The Struct_S 305 is read 310 by a native type generator 315, which is arranged to generate 320 a NativeData structure 335 on the first platform. Notably, the Struct_S 305 is placed on the second platform 330 without being modified.

On the first platform, the size of the Struct_S 335 may be 6 bytes, whilst on the second platform, the size of the Struct_S may be 12 bytes. By generating the native data type, the native Struct_S will have the same memory layout on platform 325 as the original Struct_S on platform 330.

The memory layout of this structure, on the two platforms, may be different, given the different size of the members. A different layout may also be obtained in a case of different alignment of the individual members. The optimized communication path minimizes the number of data conversions. Here, the term communication path is used to denote the data flow.

To appreciate the inventive concept, it is worth considering, for example, the platforms in the scenario above (325, 330), as applied to run-time conversions in prior art scenarios, the approach may utilise a number of the following steps:
1) Compile applications using structure S on platform 325 and platform 330;
2) Run applications ('1' on platform 325 and '2' on platform 330);
3) Application '1' fills data into S (from platform 325);
4) Application '1' converts S at run-time to standard binary representation (whichever that may be);
5) Application '1' sends the bit stream to platform 330;
6) Application '2' receives the bit stream on platform 330;
7) Application '2' converts received data from standard representation to its own S;
8) Application '2' reads data from S.

In contrast, by employing the inventive concept herein described, may comprise a number of the following steps:
1) Convert S to native structure S on platform 325;
2) Compile applications using native S on platform 325 and S on platform 330;
3) Run applications ('1' on platform 325 and '2' on platform 330)
4) Application '1' fills data into native S (from platform 325);
5) Application '1' sends the bit stream to platform 330;
6) Application '2' receives the bit stream on platform 330;
7) Application '2' reads data from S.

Notably, in accordance with embodiments of the present invention, a single conversion between the data layout formats is performed at the compile time, instead of two data layout format conversions (from native source to standard format, and from the standard format to the target destination). Furthermore, the number of conversions is minimized. Advantageously, the effort is mainly performed off-line, before software compilation.

Thus, the inventive concept proposes working on one side of an interface of the communication system, by converting data type in a layout format that does not need conversion when transmitted to the other side of the interface. Notably, this format is generated before the compile time.

One application of the inventive concept herein described is the communication between processors based on different architectures (for example one digital signal processor (DSP) based on StarCore™ and one application processor) as are deployed in Media Gateways where the DSP array is controlled by the application processor.

Referring now to FIG. 4, a flowchart 400 illustrates an operation of the software tool that translates definition of data types, according to one embodiment of the present invention. The software tool receives, as an input one or more of the following:
(i) Structure definition types that define messages to be exchanged;
(ii) The ABI of the local platform; and
(iii) The ABI of the target platform that was selected as the reference platform.

For each data type, in the structured definitions received, the software tool generates further peer types that ensure the memory layout resulting from the compiling operation is identical to the memory layout resulting from the target platform when compiling the original type defined.

The method commences with parsing a type definition file (header file) as shown in step 405. The output of this action would be that for every data type defined in the definition file, the following information may be stored:

(i) The data type size (for both the target platform and local platform);

(ii) The data type alignment (for both the target platform and local platform); and (iii) If the data type is aggregate (or composite), for each member, information about its size and alignment is stored for both the target platform and local platform.

A determination is then made as to whether more data types of a definition file are available to process, as shown in step 410. If there are no more data types of definition file available to process, in step 410, the process terminates in step 415. If there are more data types of definition file available to process, in step 410, a determination is made as to whether the parsed definition file data types may be aggregated as shown in step 420. If the parsed definition file data types may not be aggregated in step 420, the process loops back to step 410.

If the parsed definition file contains aggregated (or composite) data types, the algorithm may determine the alignment of the entire aggregated data type. The rule may be that this is established such that it is acceptable for all inner members of the data type. To start, the less constrictive alignment may be the byte alignment (alignment to '1' byte). As such, the crtAlignment is set to '1'. The algorithm updating this variable, in its pursuit to determine the best match for alignment, may then set the byte alignment to '2' if there is a member in the structure requiring alignment at '2' bytes, etc.

A determination is then made as to whether more members require processing as shown in step 430, e.g. the process takes each primitive member in every data type and verifies that its alignment satisfies the reference alignment. Thus, although in FIG. 4 primitive members comprise the composite/aggregated data types, it is envisaged that the algorithm may also work on composite members inside composite members. If no more members are available to process, in step 430, padding is added to the peer generating type, in order to align the new member, e.g. the generated aggregate type, according to the target ABI, as shown in step 435. The generated type are then flushed in step 440, and the process loops back to step 410.

If more members are available to process, in step 430, a determination is made as to whether the CrtAlignment function satisfies the member alignment, as shown in step 445. If the CrtAlignment function fails to satisfy the member alignment in step 445, padding is added to the parsed definition file data types in order to satisfy current member alignment, as shown in step 450. A determination is then made as to whether the size of the target data type is smaller than a local data type, as shown in step 455. If the size of the target data type is smaller than a local data type, in step 455, another local data type with the same size as the target data type is selected, as shown in step 460. The member is then placed in the generated data type definition file, as shown in step 465.

Alternatively, if the size of the target data type is not smaller than a local data type, in step 455, a determination is made as to whether the size of the target data type is larger than a local data type, as shown in step 470. If the target data type is larger than the local data type, in step 470, padding is added to the data type definition file before, or after, the generated member, depending upon the data type of endian used, as shown in step 475. The member is then placed in the generated data type of definition file, as shown in step 465. The CrtAlignment value is then updated with the member that has been added in the generated aggregate data type, as shown in step 480. The process then loops back to step 430, and a determination is made as to whether more members are available for processing.

It will be understood that the improved system, apparatus and method for communicating data, as described above, aims to provide at least one or more of the following advantages:

(i) Employing the inventive concept defines a data type translation mechanism that requires minimal run-time processing.

(ii) Employing the inventive concept requires only a small overhead in data size, which maintains the data in such a form, that (from the perspective of the memory layout) the data requires no transformation when exchanged between source and destination. Advantageously, only a small overhead in data size is needed to align the inner members of a composite data type, thus maintaining the data in such a form.

(iii) Employing the inventive concept provides better speed performance for the software applications, by replacing the data conversions performed at run-time (see above steps '4' and '7' from a typical data conversion) with re-formatting the data types used in the communication process.

(iv) Employing the inventive concept provides increased flexibility of the communication format.

(v) Employing the inventive concept provides improved programmability of the communication software, by using an automated generator of the exchanged structured data types.

In particular, it is envisaged that the aforementioned inventive concept can be applied by a semiconductor manufacturer to any processing system or architecture, for example those of the Freescale™ digital signal processor family. It is further envisaged that, for example, a semiconductor manufacturer may employ the inventive concept in a design of a stand-alone device, and/or application-specific integrated circuit (ASIC) and/or any other sub-system element. It is further envisaged that the inventive concept may be applied to multi-core architectures, where cores of different natures (or types) communicate data.

It will be appreciated that any suitable distribution of functionality between different functional units may be used without detracting from the inventive concept herein described. Hence, references to specific functional devices or elements are only to be seen as references to suitable means for providing the described functionality, rather than indicative of a strict logical or physical structure or organization.

Aspects of the invention may be implemented in any suitable form including hardware, software, firmware or any combination of these. The elements and components of an embodiment of the invention may be physically, functionally and logically implemented in any suitable way. Indeed, the functionality may be implemented in a single unit or IC, in a plurality of units or ICs or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality.

Thus, an improved system, apparatus and method for communicating data have been described, wherein the aforementioned disadvantages with prior art arrangements have been substantially alleviated.

The invention claimed is:

1. A distributed processor-based system comprising:
a first platform communicating with a second platform, the first platform comprising:
at least one compiler, the at least one compiler being operably coupled to automated data type translation logic; and
the automated data type translation logic, in response to indications for data to be transferred from the first platform to the second platform, to automatically translate input source code into output source code, wherein:
the input source code contains user application data types of the data;
the output source code contains new peer data types of the data; and
the translating comprises:
converting the user application data types of the data into the new peer data types based on at least one platform-specific characteristic of the second platform, wherein compilation of the new peer data types generates a memory layouts for the first platform such that data generated at the first platform under the new peer data types is generated without insertion of code into the output source code that converts user application data types of the generated data into new peer data types of the generated data at runtime and such that the data generated at the first platform under the new peer data types does not require run-time conversion when received at the second platform;
the translating further comprises:
parsing a type definition file for aggregate and/or composite data types;
determining whether a data type of the parsed type definition file may be aggregated;
when the data type may be aggregated into an aggregate or composite data type:
determining whether a size of a second platform data type is smaller than a size of a first platform data type of the aggregate or composite data type;
selecting another first platform data type with the same sized as the second platform data type in response to determining that the size of the second platform data type is smaller than a size of the first platform data type; and
placing a member of the selected other first platform data type in the aggregate or composite data type that comprises it in order to generate a type definition file.

2. The distributed processor-based system of claim 1 wherein the system is a distributed processor-based inter-platform communication or computer system.

3. The distributed processor-based system of claim 1 wherein the automatic parsing and converting is performed by the automated data type translation logic before a compilation time of code wherein execution of the code generates the data to be transferred from the first platform to the second platform.

4. The distributed processor-based system of claim 1 wherein a second application running on the second platform receives communicated data from a first application running on the first platform such that the communicated data may be accessed directly in the memory layout generated by code compiled using a second compiler on the second platform.

5. The distributed processor-based system of claim 1 wherein the memory layout for the first platform generated by compilation of the new peer data types is the same as a memory layout generated on the second platform by compilation on the second platform of the new peer data types.

6. The distributed processor-based system of claim 1 wherein the at least one compiler comprises a software tool arranged to translate type definitions of the user application data types contained in the input source code into type definitions of the new peer data types contained in the output source code.

7. The distributed processor-based system of claim 1 wherein:
the distributed processor-based system further comprises a third platform communicating with the first platform;
the first platform is to transmit data to the third platform; and
the automated data type translation logic is arranged to select the second platform as a reference platform for translation of data types based upon one or more of the following criteria:
the reference platform runs a performance constrained application; and
the reference platform runs an application that acts as a supplier of services for software on other platforms.

8. The distributed processor-based system of claim 1 wherein the automated data type translation logic is arranged to automatically parse and convert user application data types to explicit user application data types and to input the explicit user application data types to the compiler.

9. An integrated circuit comprising:
automated data type translation logic arranged to automatically translate input source code into output source code, wherein:
the input source code contains user application data types of data to be transferred from a first platform to a second platform;
the output source code contains new peer data types of the data; and
the translating comprises converting type definitions of the user application data types contained in the input source code into type definitions of the new peer data types contained in the output source code based on at least one platform-specific characteristic of the second platform, wherein compilation of the new peer data types generates memory layouts for the first platform such that data generated at the first platform under the new peer data types is generated without insertion of code into the output source code that converts user application data types of the generated data into new peer data types of the generated data at runtime and such that the data generated at the first platform under the new peer data types does not require run-time conversion when received at the second platform; and the translating further comprises:
  parsing a type definition file for aggregate and/or composite data types:
  determining whether a data type of the parsed type definition file may be aggregated;
  when the data type may be aggregated into an aggregate or composite data type:
    determining whether a size of a second platform data type is smaller than a size of a first platform data type of the aggregate or composite data type;
    selecting another first platform data type with the same size as the second platform data type in response to determining that the size of the second platform data type is smaller than a size of the first platform data type; and
    placing a member of the selected other first platform data type in the aggregate or composite data type that comprises it in order to generate a type definition file.

10. The integrated circuit of claim 9, wherein the converting type definitions further comprises:
padding a data type of the new peer data types by adding an new member to the data type in order to satisfy a data type size, the adding the new member including defining a data type of the new member, assigning a name to the new member, and adding the named new member to a list of members of the data type.

11. The integrated circuit of claim 10, further comprising:
padding a data type of the new peer data types by adding an unused member to the data type in order to satisfy a data type size.

12. The integrated circuit of claim 10, further comprising:
padding a data type of the new peer data types by adding an unused member to the data type when no more members are available to process, in order to satisfy a data type size.

13. The integrated circuit of claim 9, wherein the automated data type translation logic is to translate a memory layout for the data that is to be generated at the first platform and to be transferred from the first platform to the second platform using an endian-ness transformation, wherein the system is arranged to facilitate communication between different endian-ness transformations.

14. A method of transferring data in a distributed processor-based system including a first platform communicating with a second platform, the first platform including at least one compiler, wherein the method comprises:
  in the first platform, automatically translating input source code into output source code, wherein:
  the input source code contains user application data types of the data;
  the output source code contains new peer data types of the data; and
  the translating comprises converting type definitions of the user application data types contained in the input source code into type definitions of the new peer data types contained in the output source code based on at least one platform-specific characteristic of the second platform, wherein compilation of the new peer data types generates memory layouts for the first platform such that data generated at the first platform under the new peer data types is generated without insertion of code into the output source code that converts user application data types of the generated data into new peer data types of the generated data at runtime and such that the data generated at the first platform under the new peer data types does not require run-time conversion when received at the second platform; and the translating further comprises:
  parsing a type definition file for aggregate and/or composite data types:
  determining whether a data type of the parsed type definition file may be aggregated;
  when the data type may be aggregated into an aggregate or composite data type:
    determining whether a size of a second platform data type is smaller than a size of a first platform data type of the aggregate or composite data type;
    selecting another first platform data type with the same size as the second platform data type in response to determining that the size of the second platform data type is smaller than a size of the first platform data type; and
    placing a member of the selected other first platform data type in the aggregate or composite data type that comprises it in order to generate a type definition file.

15. The method of claim 14, further comprising:
padding a data type of the new peer data types by adding an unused member to the data type in order to satisfy a data type size.

16. The method of claim 14, further comprising:
padding a data type of the new peer data types by adding an unused member to the data type when no more members are available to process, in order to satisfy a data type size.

17. The method of claim 14 further comprising:
storing, for every data type of the new peer data types for one or both of the first platform and the second platform, one or more of the following:
(i) A data type size;
(ii) A data type alignment; and
(iii) If the data type is aggregate or composite, for each member, information about its size and alignment.

18. The method of claim 14 further comprising:
storing, for every type defined in the type definition file for one or both of the first platform and the second platform, one or more of the following:
(i) A data type size;
(ii) A data type alignment; and
(iii) If the data type is aggregate or composite, for each member, information about its size and alignment.

* * * * *